United States Patent [19]
Anderson et al.

[11] Patent Number: 6,027,053
[45] Date of Patent: Feb. 22, 2000

[54] AUTOMATIC FUNNEL POSITIONING SYSTEM FOR SPINNER SPREADER MACHINE

[75] Inventors: Dean I. Anderson, Paynesville; Douglas L. Pettit, Benson, both of Minn.

[73] Assignee: Ag-Chem Equipment, Minnetonka, Minn.

[21] Appl. No.: 09/061,309

[22] Filed: Apr. 16, 1998

[51] Int. Cl.⁷ ................................................. A01C 17/00
[52] U.S. Cl. ............................................. 239/681; 239/69
[58] Field of Search ................................. 239/63, 69, 71, 239/155, 156, 172, 656, 681; 701/50

[56]  References Cited

U.S. PATENT DOCUMENTS

| | | | |
|---|---|---|---|
| Re. 35,100 | 11/1995 | Monson et al. | 111/130 |
| 3,876,055 | 4/1975 | Tyznik | 198/7 |
| 4,023,020 | 5/1977 | Lestradet | 235/151.2 |
| 4,212,428 | 7/1980 | Walker | 239/677 |
| 4,352,445 | 10/1982 | Cusuman et al. | 222/611 |
| 4,630,773 | 12/1986 | Ortlip | 239/1 |
| 4,878,598 | 11/1989 | Ruschhaupt | 222/1 |
| 5,085,372 | 2/1992 | Martin | 239/675 |
| 5,234,128 | 8/1993 | Hill | 222/63 |
| 5,301,848 | 4/1994 | Conrad et al. | 222/613 |
| 5,355,815 | 10/1994 | Monson | 111/200 |
| 5,386,943 | 2/1995 | Peeters | 239/675 |
| 5,453,924 | 9/1995 | Monson et al. | 364/131 |
| 5,605,105 | 2/1997 | Clark et al. | 111/127 |
| 5,737,221 | 4/1998 | Newton | 364/424.07 |
| 5,751,576 | 5/1998 | Monson | 364/188 |
| 5,755,382 | 5/1998 | Skotinkov | 239/161 |
| 5,809,440 | 9/1998 | Beck et al. | 701/50 |
| 5,870,686 | 2/1999 | Monson | 701/1 |
| 5,884,205 | 3/1999 | Elmore et al. | 701/50 |

*Primary Examiner*—Andres Kashnikow
*Assistant Examiner*—Lisa Ann Douglas
*Attorney, Agent, or Firm*—Larkin, Hoffman, Daly & Lindgren, Ltd.

[57] ABSTRACT

The spinner spreader machine includes a funnel that is automatically or selectively repositionable and associated with the spinner. The funnel is used to vary the product spreading pattern or maintain a consistent product spreading pattern in combination with a varying product delivery rate as the machine traverses a geographic land area. The machine is used to disperse stored products over a geographic land area and advantageously reduces or eliminates product waste as well as surface and ground contamination that results from inefficient spreading of products.

21 Claims, 8 Drawing Sheets

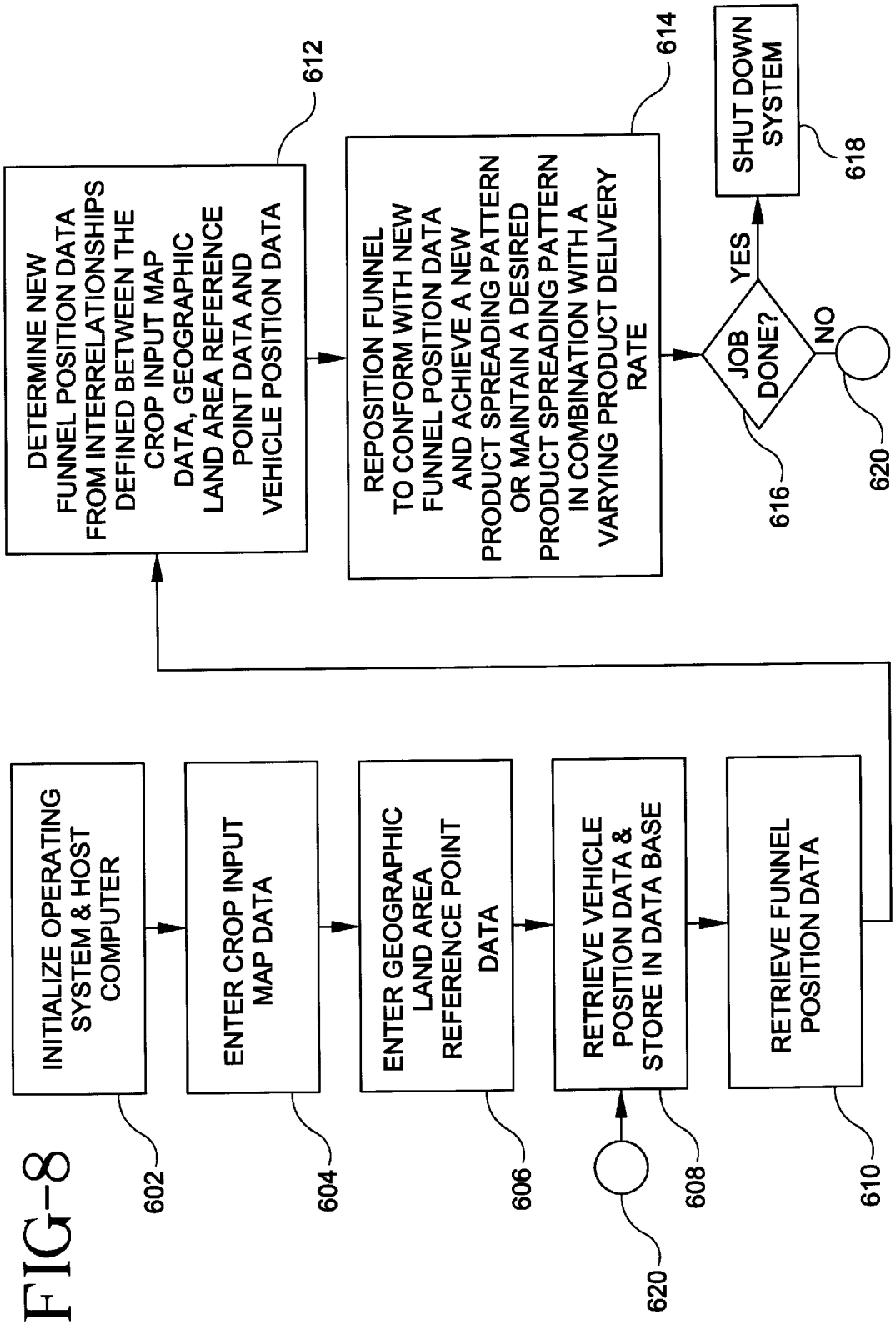

AUTOMATIC FUNNEL POSITIONING SYSTEM FOR SPINNER SPREADER MACHINE

BACKGROUND OF THE INVENTION

The invention relates to spinner spreader machines. More particularly, the invention relates to a spinner spreader machine that automatically adjusts positioning of the spinner spreader funnel apparatus to allow product spreading patterns to be changed on-the-go in response to changing quantity and prescription requirements.

Spinner spreader machines are used to deliver fertilizer products over a desired geographic land area. Conventional spinner spreader apparatus such as the models L2020 and model L3020 manufactured by Highway Equipment Company of Cedar Rapids, Iowa, generally include a belt conveyor to transport fertilizer and the like from a product storage bin to a spinner spreader mechanism at the rear of the spinner spreader machine. The belt conveyor generally deposits the product into a funnel positioned above the spinner spreader mechanism to achieve a spread pattern at a selectively variable rate.

The present inventors have found that product application requirements for fertilizers, lime and the like, can change significantly within a short distance, often within ten feet or less. Some spinner spreader machines require that a machine operator stop the machine, get out of the cab, and go to the back of the spinner spreader machine to manually adjust the position of the spinner spreader funnel in order to maintain the spread pattern of the product and to achieve a new application rate. Some spinner spreader machines may have a rear gate apparatus that is manually controlled which is generally unsuitable to provide a variable spreading rate and does not provide the accuracy necessary for non-fixed application rates. Some spinner spreader machines have been developed that automatically adjust the product application rate by means of a gate height control mechanism located within the cab of the spinner spreader machine. Generally, the product application rate is controlled by adjusting the ground speed of the spinner spreader machine and by adjusting another variable such as conveyor belt speed in order to apply a given amount of product over a specified area. Such an approach is time consuming and requires some trial and error in order to determine the proper settings involved, e.g., gate height, conveyor belt speed and the like. Some spinner spreader machines may produce product application patterns that are difficult to maintain as applications rates vary. Some machines may create water and/or ground contamination due to settings that may result in excessive product application rates.

U.S. Pat. No. 5,085,372, issued Feb. 4, 1992 to Martin, entitled, Manure Spreaders, discloses a machine that uses a gate mechanism to control the rate of product application through a trial and error process. Similarly, U.S. Pat. No. 5,386,943, issued Feb. 7, 1995 to Peeters, entitled, A Purpose V-Shaped Manure Spreader and U.S. Pat. No. 3,876,055, issued Apr. 8, 1975, entitled, Farm Waste Material Handler, discloses product applicator machines that use a trial and error process to control the product application rate.

Machines and associated methods of accurately controlling the rate of product application have been developed. U.S. Pat. No. 5,301,849, issued Apr. 12, 1994 to Conrad et al., entitled, Electromagnetic Meter For Closed Dispensing Container, discloses a metering device for controlling the flow rate of granular material through a conduit. U.S. Pat. No. 5,234,128, issued Aug. 10, 1993 to Hill, entitled, Aggregate Material Spreader, discloses a material spreader attached to a motor vehicle that receives and dispenses an aggregate material in predetermined quantities. U.S. Pat. No. 4,878,598, issued Nov. 7, 1989 to Ruschhaupt, Jr., entitled, Method And Apparatus for Dispensing A Substance To A Work Area, discloses a method and apparatus for dispensing a substance using a trial and error procedure. U.S. Pat. No. 4,352,445, issued Oct. 5, 1982 to Cusumano et al., entitled, Building Material Applicator, discloses an applicator for introducing and spreading building material in a controlled manner using a metering device.

Still needed is a spinner spreader machine having the ability to automatically adjust product spreading patterns and/or rates on-the-go to meet the needs of a geographic land area having inconsistent and/or quickly changing soil characteristics, e.g., fertility levels, moisture content, residual chemical content, soil type and the like, that vary significantly within short distances often feet or less.

All references cited herein, including the foregoing, are incorporated herein in their entireties for all purposes.

SUMMARY OF THE INVENTION

Accordingly, the present inventive spinner spreader machine advantageously overcomes many of the shortcomings and attendant disadvantages of known spinner spreader machines that share problems considered unavoidable within the industry. The present invention surmounts these problems with an advantageous new system that includes an automated spinner spreader funnel positioning apparatus to enhance and optimize selective application of lime, fertilizer and other like products. The system includes a funnel that automatically repositions itself while above a spinner spreader mechanism. The product spread pattern adjusts to accommodate product prescription and quantity requirements that are dictated by soil characteristics and other geographic information that may vary significantly within a distance often ten feet or less. The novel apparatus utilizes a linear actuator to reposition the funnel and to control the speed and direction of movement of the funnel as the funnel repositions itself in response to stored data or operator inputs on-the-go as the spinner spreader machine traverses a geographical land area.

Other features of the spinner spreader machine includes multiple spinners and multiple automated funnel apparatus, thereby allowing a greater variety of product application patterns and/or rates, or optional simultaneous application of lime and fertilizer products.

Yet another feature of the spinner spreader machine includes multiple automated funnel apparatus, thereby allowing simultaneous delivery of like or dissimilar products stored in a plurality of different product storage bins attached to the same machine.

In sum, the invention relates to a spinner spreader machine which includes a vehicle, at least one bin adapted to hold a product and associated with or attached to the vehicle, at least one spreader mechanism associated with or attached to the vehicle, at least one funnel apparatus associated with or coupled to the vehicle, and at least one automated funnel repositioning apparatus associated with the funnel apparatus. The automated funnel repositioning apparatus is adapted to selectively position the funnel apparatus while the vehicle is traversing a geographic area. The product is transported from the bin(s) into the funnel apparatus and onto the spreader mechanism to achieve a desired product spreading pattern for a predetermined number of sites within the geographical area. The spinner spreader machine may further include a control system operatively coupled to the automated funnel repositioning apparatus. The control system includes a data processor, a data input device in communication with the data processor, an algorithmic software directing the data processor, and a data storage unit. The product spreading pattern data associated with the funnel apparatus is stored and supplied to the data processor such that the data processor, directed by the algorithmic software, automatically determines discrete funnel positioning data for repositioning the funnel apparatus to vary a product spreading pattern as the vehicle traverses a geographic land area. The algorithmic software may be further configured to direct the data processor to automatically determine discrete funnel positioning data for repositioning the funnel apparatus for a substantially consistent product spreading pattern in combination with a varying product application rate. The funnel repositioning apparatus may further include a linear actuator configured to selectively move the funnel apparatus in a linear direction substantially parallel to the geographic land area as the vehicle traverses the geographic land area. The funnel repositioning apparatus may further include a variable speed drive mechanism for selectively varying a speed and direction of motion for the linear actuator. The vehicle may be self-propelled or towed.

The invention also relates to a spinner spreader machine which includes a vehicle, storing means associated with or attached to the vehicle for storing at least one product, spinning means associated with or attached to the vehicle for spreading the product onto a geographic land area, funneling means associated with or coupled to the vehicle for depositing or directing the product onto the spinning means, and positioning means associated with or coupled to the funneling means for selectively repositioning the funneling means above the spinning means while the vehicle is traversing the geographical land area. The product is transported from the storing means and deposited onto the funneling means. The product then exits the funneling means onto the spinning means to achieve a desired product spreading pattern that is specific to each site for a predetermined number of sites within the geographic land area. The spinner spreader machine may further include controlling means for controlling the positioning means. The controlling means includes data processing means for processing data, data entering means for communicating with the data processing means, an algorithmic software directing the data processing means, and data storing means for storing product spreading pattern data associated with the funneling means and providing the spreading pattern data to the data processing means. The data processing means is directed by the algorithmic software and automatically determines discrete funnel positioning data for repositioning the funneling means to vary a product spreading pattern as the vehicle traverses the geographic land area. The algorithmic software may direct the data processing means to automatically determine discrete repositioning data for controlling the funneling means to attain a substantially consistent product spreading pattern in combination with a varying product application rate. The positioning means includes actuating means for providing linear repositioning of the funneling means in a direction substantially parallel to the geographic land area. The positioning means may further include means for selectively varying a speed and direction of motion for the actuating means.

The invention also relates to a spinner spreader machine which includes a vehicle, at least one product storage bin associated with or attached to the vehicle, at least one spinner apparatus associated with or attached to the vehicle, at least one funnel attached to the vehicle, and an automated funnel positioning system configured for selectively repositioning the funnel as the vehicle traverses a predetermined land area to achieve a plurality of product spreading patterns over the predetermined land area. The funnel positioning system may include a data processor, a data input device in communication with the data processor, an algorithmic software directing the data processor, and a data storage unit. Crop input data associated with the predetermined land area is stored and supplied to the data processor. The data processor, directed by the algorithmic software, automatically determines product spreading pattern data for actuating the funnel positioning system using the crop input data and geographic land area reference point data and algorithmically defined relationships therebetween. The funnel is repositioned to vary a product spreading pattern as the vehicle traverses the geographic land area. The algorithmic software may direct the data processor to automatically determine discrete repositioning data for controlling the funnel to attain a substantially consistent product spreading pattern in combination with a varying product application rate as the vehicle traverses the geographic land area. The funnel positioning system may further include a linear actuator to selectively move the funnel in a linear direction substantially parallel to the geographic land area as the vehicle traverses the geographic land area. The funnel positioning system may further include a variable speed drive motor for selectively varying a speed and direction of motion of the linear actuator.

From the foregoing, it is clear that the present inventive spinner spreader machine performance is greatly enhanced over existing systems. Other features of the present inventive apparatus include ease of use, enhanced serviceability, maintainability, upgradability, and enhanced expansion and diagnostics capability.

Still other objects and advantages of the present invention and methods of construction and use of the same will become readily apparent to those skilled in the art from the following detailed description, wherein only the preferred embodiments are shown and described, simply by way of illustration of the best mode contemplated of carrying out the invention. As will be realized, the invention is capable of other and different embodiments and methods of construction and use, and its several details are capable of modification in various obvious respects, all without departing from the invention. Accordingly, the drawings and description are to be regarded as illustrative in nature, and not as restrictive.

BRIEF DESCRIPTION OF THE DRAWINGS

FIG. 8 illustrates one embodiment of a software algorithm suitable for use with the automated control system shown in FIG. 7 to implement one embodiment of the present invention.

DETAILED DESCRIPTION OF THE INVENTION

The preferred embodiments described address the long felt need by those in the agricultural product application industries to provide a highly efficient spinner spreader machine. The present invention may advantageously be used for application such as lime, fertilizer, seeds, chemicals and the like, where accuracy standards must be maintained, water and ground contamination must be eliminated or substantially reduced and product waste must be eliminated or substantially reduced. In accordance with the present invention, the preferred embodiments described can readily and selectively vary spread patterns and/or rates for predetermined products on-the-go as a spinner spreader machine traverses a geographic land area.

Figure 1:
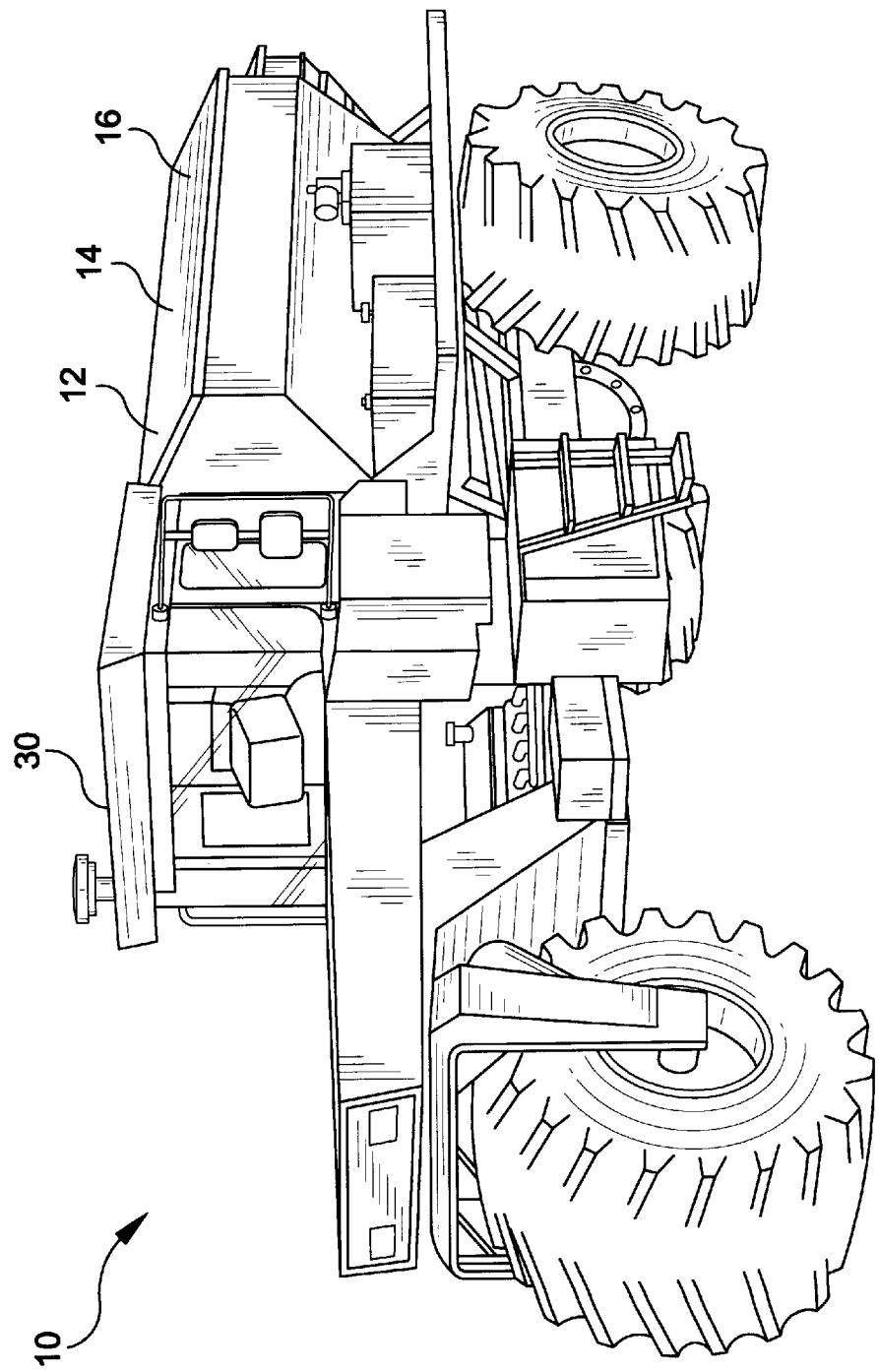
FIG. 1 illustrates a perspective view of a spinner spreader machine.

FIG. 1 illustrates a perspective view of a spinner spreader machine 10. Generally, spinner spreader machines are provided with a number of control mechanisms, e.g., conveyor speed, start, stop, gate opening height, storage bin discharge flow rate, and the like to obtain some level of control for the product(s) being applied to a geographic site. While such machines are commercially available and are commonly used to apply fertilizer products, attempts to use these same machines to apply certain products have proven to be greatly inadequate to achieve the desired product dispensing rates and spreading patterns. The present invention overcomes prior art limitations by providing a spinner spreader machine configured to include a novel automated funnel positioning assembly.

Figure 2:
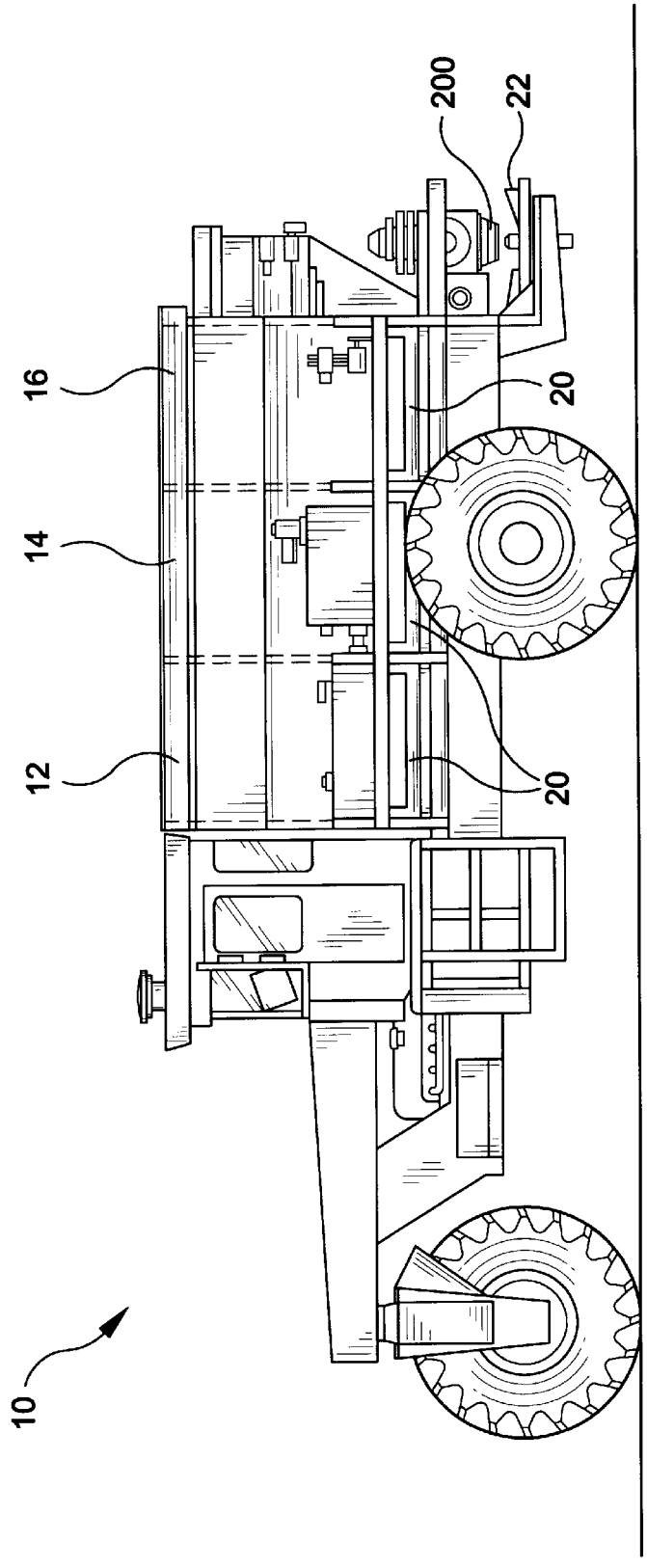
FIG. 2 illustrates a side view of the spinner spreader machine shown in FIG. 1.

FIG. 2 illustrates a side view of the spinner spreader machine 10. Spinner spreader machine 10 includes a plurality of product storage bins 12, 14, 16 for selectively storing lime, fertilizer, seeds, pesticides, herbicides, or other agricultural products. The spinner spreader machine 10 also includes a conveyor system 20 for transporting the product(s) stored in bins 12, 14, 16 to a spinner apparatus 22. Typically, the spinner spreader machine 10 includes interconnecting devices (not shown) that allow the machine 10 to switch back and forth between desired bins 12, 14, 16 which store the same or different products such as lime and fertilizer.

Figure 3:
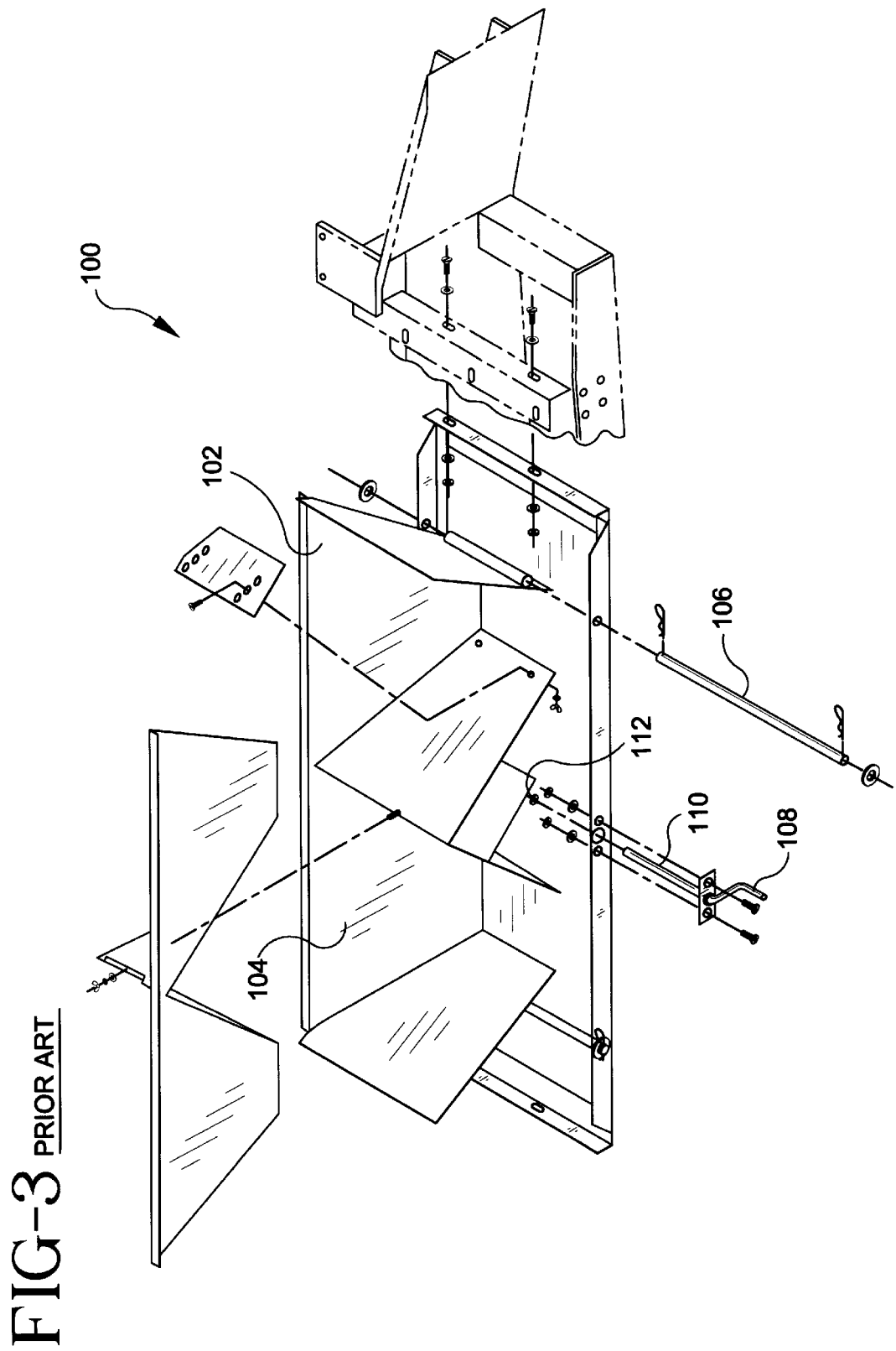
FIG. 3 illustrates a perspective view of a manually adjustable spinner spreader machine funnel apparatus known in the prior art.

Looking now at FIG. 3, a perspective view of a manually adjustable spinner spreader funnel positioning assembly 100 known in the prior art is illustrated. The funnel positioning assembly 100 has a pair of funnels 102, 104 to accommodate simultaneous delivery of products stored in different storage bins. The funnel positioning assembly 100 has a plurality of guide rods 106 to allow and control planar movement of the assembly 100. A hand crank 108 is used to rotate a threaded rod 110 through a female threaded adapter 112 attached to the funnels 102, 104 thereby urging the positioning assembly 100 in a direction parallel to the direction of spinner spreader machine movement. It will be appreciated that the manually adjustable spinner spreader funnel positioning assembly 100 is time consuming and cumbersome for a machine operator to use since certain product spreading sites may require the operator to stop the machine, get out of the cab and go to the rear of the spinner spreader machine to operate the hand crank 108 each time the operator desires to vary the product spread pattern and/or rate.

Figure 4:
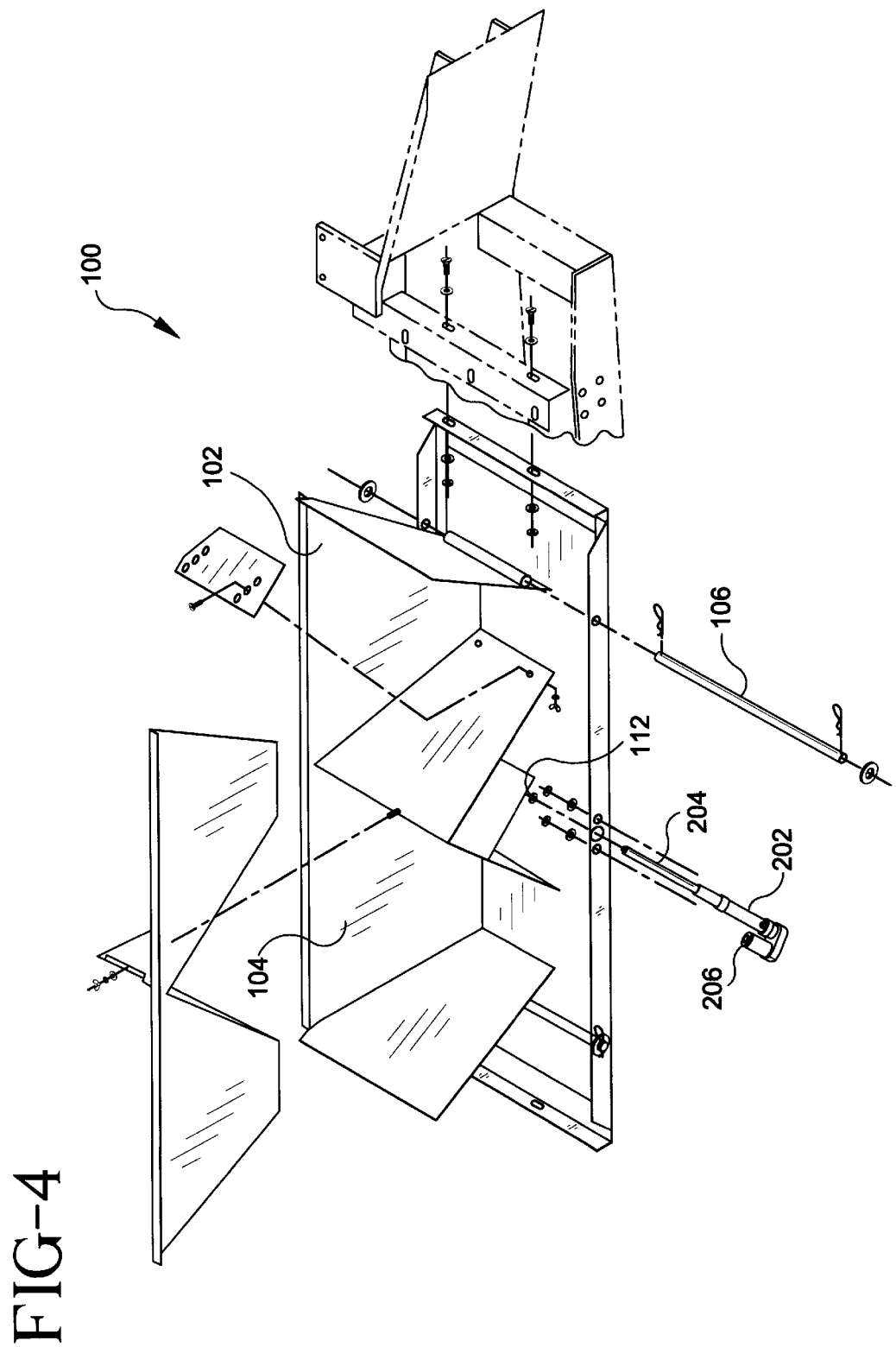
FIG. 4 illustrates an automated spinner spreader funnel positioning apparatus in accordance with one embodiment of the present invention.

FIG. 4 illustrates an automated spinner spreader funnel positioning apparatus 200 in accordance with one embodiment of the present invention. The automated funnel positioning apparatus 200 includes a pair of funnels 102, 104 such as that employed on the model HC-3000L spinner spreader machine available from Lor*Al Products, Inc. of Benson, Minn. A linear actuator device (enumerated as 300 in FIG. 5) includes an actuator housing 202 that provides lubrication and protective casing for an actuator arm 204. The actuator arm 204 is powered between its fully extended position and its fully retracted position via a variable speed reversible motor 206. The variable speed motor 206 is attached to the spinner spreader machine such that movement of the actuator arm 204 will provide linear repositioning of the funnels 102, 104 thereby allowing the spinner mechanism 22 to achieve a desired product spread pattern and/or delivery rate. It shall be understood that the actuator arm 204 can be formulated as a threaded device or as a non-thread bearing device provided the desired linear, reversible, variable speed motion can be achieved.

Figure 5:
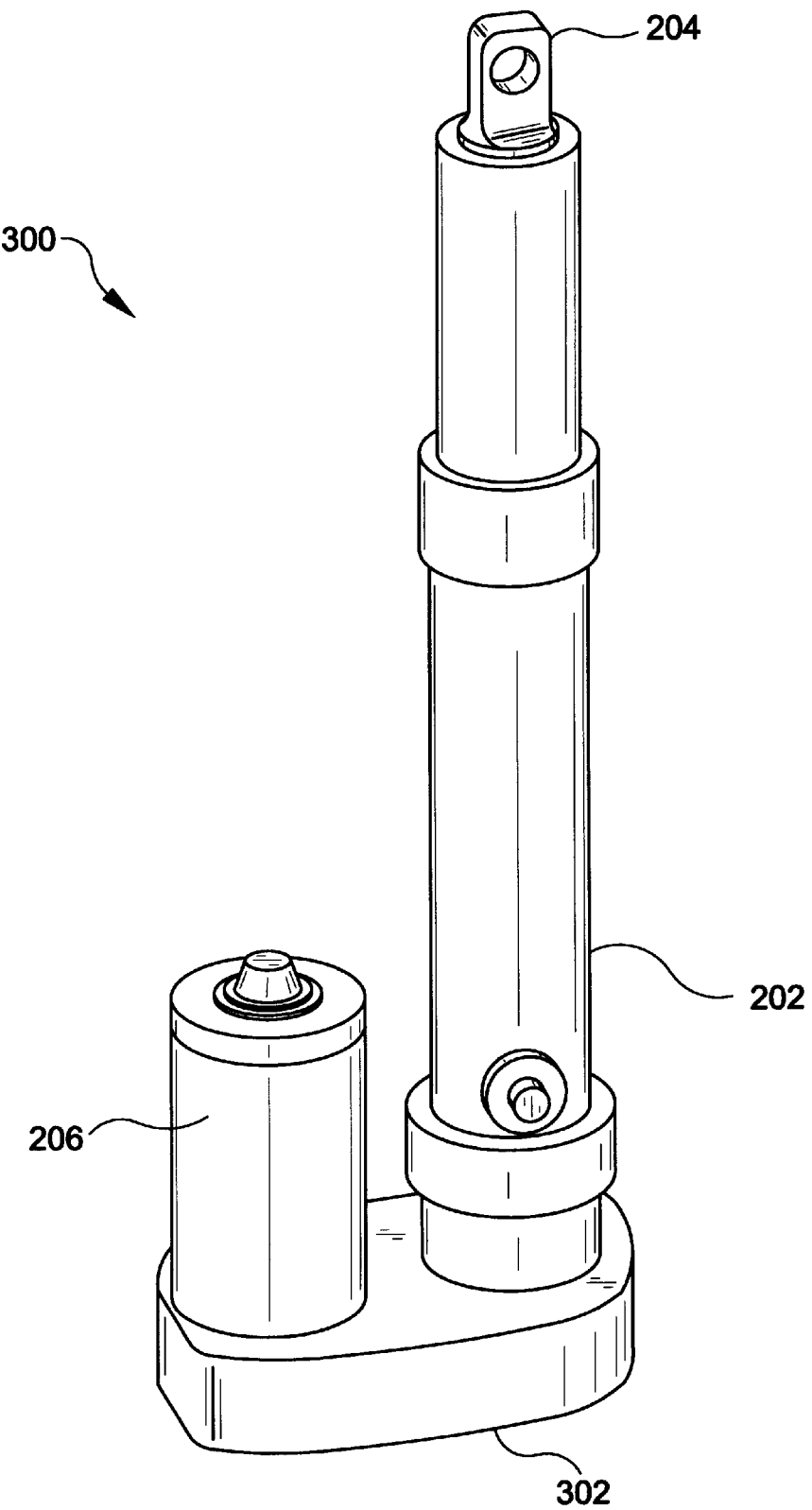
FIG. 5 illustrates a linear actuator device known in the art, and that is suitable for use with the positioning apparatus shown in FIG. 4.
Figure 6:
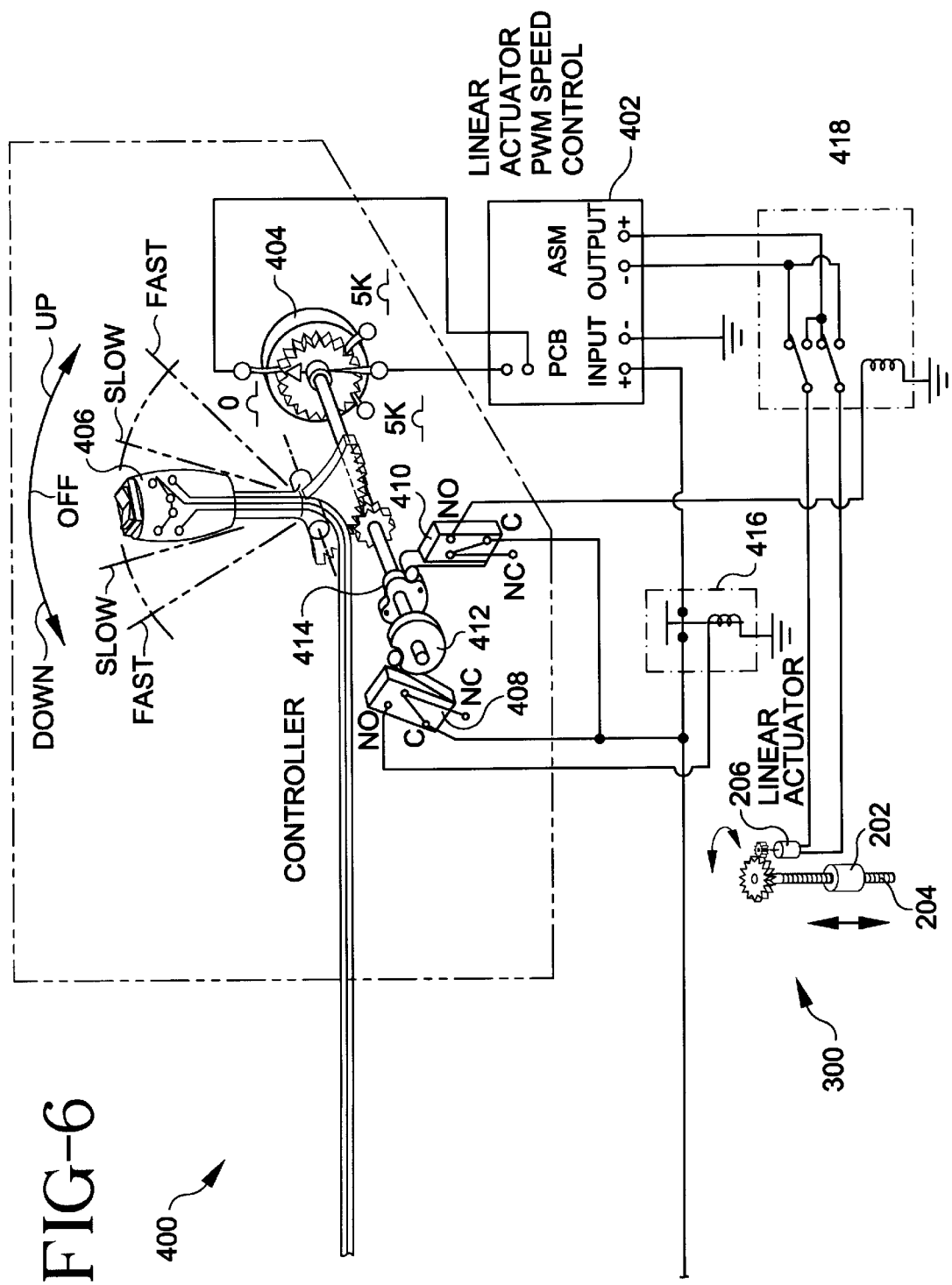
FIG. 6 illustrates one embodiment of an operator control system suitable to operate the positioning apparatus shown in FIG. 4.

FIG. 5 illustrates a linear actuator device 300 known in the art, which is suitable for use with the positioning apparatus 200 shown in FIG. 4. The linear actuator 300 represents a model PPA linear actuator manufactured by Thomson Saginaw Ball Screw Company, Inc., and is available with either a ball screw or acme screw actuation. The present invention is not so limited however, and it will readily be appreciated that many other types of electrically driven linear actuators will suffice to provide the necessary planar motion required by the present embodiment. Moving now to FIG. 6, a pictorial schematic diagram illustrates one embodiment of an operator control system 400 suitable to operate the positioning apparatus 200 shown in FIG. 4. The control system 400 has a pulse width modulating (PWM) system controller 402 such as a Vexilar Motor MAX™ manufactured by Vexilar, Inc. of Minneapolis, Minn. The PWM system controller 402 works in conjunction with the linear actuator 300 to selectively control the direction and speed of the horizontal planar motion of the funnels 102, 104 such that the machine operator no longer needs to stop the spinner spreader machine, and go to the back of the machine to perform manual funnel 102, 104 positioning adjustments. The PWM system controller 402 also functions in combination with a rheostat 404 that can be adjusted to vary the voltage level and polarity used to power the linear actuator 300 variable speed drive motor 206. In this manner, the actuator arm 204 stroke distance, direction of movement and speed can be precisely controlled via a hand lever 406 conveniently located within the spinner spreader machine operator cab. Most preferably, the stroke speed is proportional to the amount of hand lever 406 movement away from its central off position depicted in FIG. 6. The PWM system controller 402 additionally functions in combination with a first micro switch 408 that is engaged via a first cam 412 to provide electrical power to a power solenoid 416 when the hand lever 406 is rotated away from its off position. With power supplied to the PWM system controller 402, the linear actuator 300 is energized and fully functional. A second micro switch 410 is similarly engaged via a second cam 414 to selectively control the polarity of electrical power delivered to the linear actuator 300 via a control solenoid 418 to precisely control the direction of movement of the linear actuator 300. The operator control system 400 represents an advantageous departure from known structures and methods used to reposition spinner spreader funnel apparatus. When used in combination with a control system such as shown in FIG. 7, the present invention provides an advantageous improvement in product spread pattern control.

Figure 7:
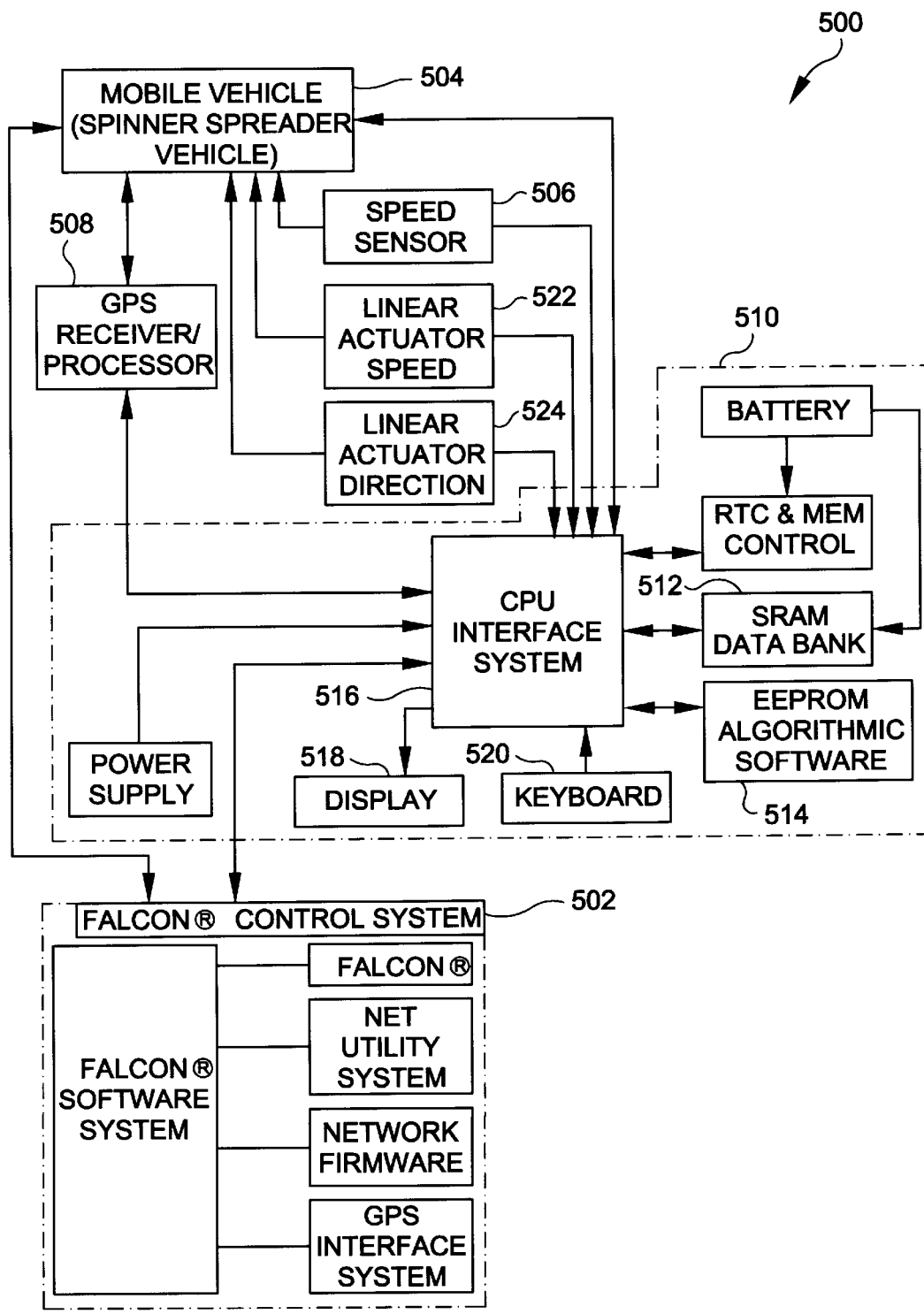
FIG. 7 illustrates a fully automated control system suitable for use with the automated spinner spreader funnel positioning apparatus shown in FIG. 4 to variably control the position and speed and direction of movement of the positioning apparatus to accommodate different product spread patterns on-the-go in conformance with one preferred embodiment of the present invention.

FIG. 7 illustrates a control system 500 suitable for use with the present spinner spreader funnel positioning apparatus 200 to variably control the speed and direction of the linear actuator 300 and to thereby selectively control repositioning of the spinner spreader funnels 102, 104 in conformance with one preferred embodiment. Modern mobile product applicator machines are increasingly being adapted with various types of automated control systems. Generally, such automated control systems include a host controller located within the operator cab of the applicator machine. Typically, an associated input device such as a keyboard and an output device such as a CRT monitor are also located within the operator cab. The host controller may be linked directly to at least one other controller located within the cab, and which is responsible for all communication to devices on the machine. A device is shown in U.S. Pat. No. 4,630,773, issued Dec. 23, 1986, to Ortlip, entitled, Method and Apparatus for Spreading Fertilizer, and U.S. Pat. No. RE 35,100, issued Nov. 28, 1995, to Monson et al., entitled, Variable Rate Application System, both assigned to Ag-Chem Equipment Company, Inc. of Minnetonka, Minn. The system disclosed in the '100 reissue patent includes a controller accessing a soil map indicating a soil characteristic for each portion of the field. Field locations and status maps which indicate current crop input level at various locations in a field are monitored by a control system. A crop input map is updated after a dispensing pass to provide a status record. Typical position locators for the machine in the field may include "Dead Reckoning," GPS, LORAN systems, or the like. U.S. Pat. No. 5,355,815 discloses yet another closed-loop variable rate applicator system. The system operates by determining a soil prescription in near real-time and dispenses crop inputs to the soil scene as a fraction of the soil prescription. The '815 patent is also assigned to Ag-Chem Equipment Company, Inc. Still another system is disclosed in U.S. Pat. No. 5,453,924, issued Sep. 26, 1995, to Monson et al., entitled, Mobile Control System Responsive To Land Area Maps. This system expands on earlier known applicator machine control systems by incorporating a network which links a host controller positioned within the operator cab to multiple controllers located at various points on the machine external to the operator cab. It shall be understood that the control systems referenced herein describe systems which, when properly configured with suitable algorithmic software, can be adapted to monitor and control the speed and direction of the present inventive spinner spreader funnel repositioning apparatus 200.

With continued reference to FIG. 7, a block diagram illustrates one preferred embodiment of a product applicator control system 500 suitable to practice the present invention which includes a FALCON® control system 502, a spinner spreader machine 504, a GPS receiver/processor 508, a vehicle speed sensor 506, linear actuator speed and direction sensors 522, 524 and a host computer system 804. The FALCON® control system 502 is manufactured by Ag-Chem Equipment Co., Inc. of Minnetonka, Minn. and can be adapted with the appropriate algorithmic software 514, to sense, measure, report and reposition the spinner spreader funnel apparatus 200, on-the-go, in near real time, by way of controlling the movement of the linear actuator arm 204. The machine operator can optionally instruct the host computer system 510 (using keyboard 520 entry) to monitor and report (via display 518) stored target application rates and the operator can manually instruct the computer system 510 to interface with appropriate sensors and controllers via an RS232 network or the like to adjust the motion and speed of the funnel repositioning apparatus 200.

Moving now to FIG. 8, one embodiment of a software algorithm 600 suitable for use with the control system 500 shown in FIG. 7 is illustrated. As can be seen in block 602, the on-board host computer and associated operating systems are initialized by the system 500 operator. Optionally, the system 500 can be initialized via an automated process upon power-up using methods familiar to those skilled in the art of computer programming. Following system 500 initialization, crop input data is then entered into a data base 512 as represented in block 604. The crop input data is most preferably associated with a particular spreading pattern or delivery rate that can be achieved with the funnel apparatus 200 in a specific position above the spinner mechanism 22. Geographic land area reference point data representing specific locations to readjust positioning of the funnel apparatus 200 are also entered into the data base 512 as shown in block 606. Algorithmic relationships are formulated using programming methods familiar to those skilled in the art to determine proper positioning of the funnel apparatus 200 for specific geographic land area reference point that the vehicle is above. As the vehicle traverses the geographic land area to be treated, the control system 500 retrieves and stores speed and position data obtained from the GPS, "Dead Reckoning," LORAN, or other like vehicle position sensing system as depicted in block 608. At each geographic land area reference point, the control system 200 retrieves the current funnel position data as shown in block 610 as well as the stored crop input map data to determine a new funnel apparatus 200 position for the desired product spreading pattern and/or product delivery rate as represented in block 612. The control system 500 then sends command signals to a linear actuator drive control mechanism 206 to adjust a linear actuator 300 to reposition the funnel apparatus 200 for the desired new product spreading pattern and/or delivery rate as referenced in block 614. If the spinner spreader machine has finished applying product(s) to the geographic land area or has otherwise been depleted of product(s), the system shuts down as can be seen in blocks 616 and 618. Otherwise, the control system 500 continues to process new vehicle position data and repositions the funnel apparatus 200 as necessary to treat the geographic land area as illustrated in balloon 620.

Having described the preferred embodiments in sufficient detail as to permit those of skill in the art to practice the present invention without undue experimentation, those of skill in the art will readily appreciate other useful embodiments within the scope of the claims hereto attached. For example, although the present invention has been described as useful for the lime and fertilizer product industries, those of skill in the art will readily understand and appreciate that the present invention has substantial use and provides many benefits in other industries as well. Some of these may include practicing the present invention to provide application of seeds, various chemicals, aggregate or any other certain constituents. In general, the agricultural community should find the present invention useful in selectively achieving accurate and efficient spreading for various products in conditions where purity standards must be maintained and product waste must be eliminated to preserve resources.

In view of the foregoing descriptions, it should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow.

We claim:

1. A spinner spreader machine comprising:
   a vehicle;
   at least one bin adapted to hold a product and associated with the vehicle;
   at least one spreader mechanism associated with the vehicle;
   at least one funnel apparatus associated with the vehicle; and
   at least one automated funnel repositioning apparatus associated with the at least one funnel apparatus, the at least one automated funnel repositioning apparatus including at least one of a linear actuator and variable speed drive mechanism adapted to selectively position the at least one funnel apparatus while the vehicle is traversing a geographic area and adapted to provide control of a desired product spreading pattern within the geographical area.

2. The spinner spreader machine of claim 1 further comprising a control system operatively coupled to the at least one automated funnel repositioning apparatus, the control system comprising:
   data processor;
   a data input device in communication with the data processor;
   an algorithmic software directing the data processor; and
   a data storage unit, wherein product spreading pattern data associated with at least one funnel apparatus is stored and supplied to the data processor, the data processor adapted to automatically determine discrete funnel positioning data for repositioning the at least one funnel apparatus and adapted to vary a product spreading pattern as the vehicle traverses a geographic land area.

3. A spinner spreader machine comprising:
   a vehicle;
   storing means associated with the vehicle for storing at least one product;
   spinning means associated with the vehicle for spreading the at least one product onto a geographic land area;
   funneling means associated with the vehicle for directing the at least one stored product onto the spinning means; and
   positioning means associated with the at least one funneling means, the positioning means including at least one of a linear actuator and variable speed drive mechanism adapted to selectively reposition the funneling means while the vehicle is traversing the geographic land area and cause a product to be transported from the storing means onto the spinning means and provide a desired spreading pattern within the geographic land area.

4. The spinner spreader machine of claim 3 further comprising controlling means for controlling the positioning means, the controlling means comprising:
   data processing means for processing data;
   data entering means for communicating with the data processing means;
   an algorithmic software directing the data processing means; and
   data storing means for storing product spreading pattern data associated with the funneling means and for providing the spreading pattern data to the data processing means to determine discrete funnel positioning data for repositioning the funneling means to vary a product spreading pattern as the vehicle traverses the geographic land area.

5. A spinner spreader machine comprising:
   a vehicle;
   at least one product storage bin attached to the vehicle;
   at least one spinner apparatus attached to the vehicle;
   at least one funnel attached to the vehicle; and
   an automated funnel positioning system configured for selectively repositioning the at least one funnel as the vehicle traverses a predetermined land area, the automated funnel positioning system including at least one of a linear actuator and variable speed drive mechanism adapted to provide a plurality of product spreading patterns over the predetermined land area.

6. The spinner spreader machine of claim 5 wherein the funnel positioning system comprises:
   a data processor;
   a data input device in communication with the data processor;
   an algorithmic software directing the data processor; and
   a data storage unit adapted for use with crop input data, geographic land area reference point data, and algorithmically defined relationships therebetween, the data storage unit adapted to store the data and the relationships and supply the same to the data processor which is adapted to automatically determine product spreading pattern data for use with actuation of the funnel positioning system, the at least one funnel adapted to be repositionable as the vehicle traverses the geographic land area in order to vary a product spreading pattern.

7. A spinner spreader machine comprising:
   a vehicle;
   at least one bin adapted to hold a product and associated with the vehicle;
   at least one spreader mechanism associated with the vehicle;
   at least one funnel apparatus associated with the vehicle;
   at least one automated funnel repositioning apparatus associated with the at least one funnel apparatus, the at least one automated funnel repositioning apparatus adapted to selectively position the at least one funnel apparatus while the vehicle is traversing a geographic area and adapted to provide control of a desired product spreading pattern within the geographical area; and
   a control system operatively coupled to the at least one automated funnel repositioning apparatus, the control system comprising: a data processor; a data input device in communication with the data processor; an algorithmic software directing the data processor; and a data storage unit;
   wherein product spreading pattern data associated with at least one funnel apparatus is stored and supplied to the data processor; wherein the algorithmic software is further configured to direct the data processor to determine discrete funnel positioning data for repositioning the at least one funnel apparatus to attain a substantially consistent product spreading pattern in combination with a varying product application rate; and wherein the data processor is adapted to automatically determine discrete funnel positioning data for repositioning the at least one funnel apparatus and to vary a product spreading pattern as the vehicle traverses a geographic land area.

8. The spinner spreader machine of claim 7 wherein the at least one funnel repositioning apparatus comprises a linear actuator adapted to selectively move the at least one funnel apparatus in one or more directions as the vehicle traverses the geographic land area.

9. The spinner spreader machine of claim 8 wherein the at least one funnel repositioning apparatus further comprises a variable speed drive mechanism for selectively varying a speed and direction of motion for the linear actuator.

10. The spinner spreader machine of claim 9 wherein the vehicle is self-propelled.

11. The spinner spreader machine of claim 9 herein the vehicle is towed.

12. A spinner spreader machine comprising:

a vehicle;

storing means associated with the vehicle for storing at least one product;

spinning means associated with the vehicle for spreading the at least one product onto a geographic land area;

funneling means associated with the vehicle for directing the at least one stored product onto the spinning means;

positioning means associated with the at least one funneling means, the positioning means adapted to selectively reposition the funneling means while the vehicle is traversing the geographic land area and cause a product to be transported from the storing means onto the spinning means and provide a desired spreading pattern within the geographic land area; and controlling means for controlling the positioning means, the controlling means comprising: data processing means for processing data; data entering means for communicating with the data processing means; algorithmic software directing the data processing means; and data storing means for storing product spreading pattern data associated with the funneling means and for providing the spreading pattern data to the data processing means to determine discrete funnel positioning data for repositioning the funneling means to vary a product spreading pattern as the vehicle traverses the geographic land area;

wherein the algorithmic software is further configured to direct the data processing means to automatically determine discrete repositioning data for controlling the funneling means at a substantially consistent product spreading pattern in combination with a varying product application rate.

13. The spinner spreader machine of claim 12 wherein the positioning means comprises actuating means for providing linear repositioning of the funneling means in a direction substantially parallel to the geographic land area.

14. The spinner spreader machine of claim 13 wherein the positioning means further comprises means for selectively varying a speed and direction of motion of the actuating means.

15. The spinner spreader machine of claim 14 wherein the vehicle is self-propelled.

16. The spinner spreader machine of claim 14 wherein the vehicle is towed.

17. A spinner spreader machine comprising:

a vehicle;

at least one product storage bin attached to the vehicle;

at least one spinner apparatus attached to the vehicle;

at least one funnel attached to the vehicle; and an automated funnel positioning system configured for selectively repositioning the at least one funnel as the vehicle traverses a predetermined land area, the automated funnel positioning system adapted to provide a plurality of product spreading patterns over the predetermined land area, the funnel positioning system comprising: a data processor; a data input device in communication with the data processor; an algorithmic software directing the data processor; and a data storage unit adapted for use with crop input data, geographic land area reference point data, and algorithmically defined relationships therebetween, the data storage unit adapted to store the data and the relationships and supply the same to the data processor which is adapted to automatically determine product spreading pattern data for use with actuation of the funnel positioning system, the at least one funnel adapted to be repositionable as the vehicle traverses the geographic land area in order to vary a product spreading pattern;

wherein the algorithmic software is further configured to direct the data processor to automatically determine repositioning data for controlling the at least one funnel at a substantially consistent product spreading pattern in combination with a varying product application rate as the vehicle traverses the geographic land area.

18. The spinner spreader machine of claim 17 wherein the funnel positioning system further comprises a linear actuator configured to selectively move the at least one funnel in a linear direction substantially parallel to the geographic land area as the vehicle traverses the geographic land area.

19. The spinner spreader machine of claim 18 wherein the funnel positioning system further comprises a variable speed drive motor for selectively varying a speed and direction of motion for the linear actuator.

20. The spinner spreader machine of claim 19 wherein the vehicle is self-propelled.

21. The spinner spreader machine of claim 19 wherein the vehicle is towed.

* * * * *